(12) United States Patent
Lavertu et al.

(10) Patent No.: US 12,194,889 B2
(45) Date of Patent: Jan. 14, 2025

(54) ENERGY MANAGEMENT FOR MULTI-INPUT PROPULSION

(71) Applicant: Transportation IP Holdings, LLC, Norwalk, CT (US)

(72) Inventors: Thomas Michael Lavertu, Ballston Lake, NY (US); Eric Dillen, Edinboro, PA (US); Adam Edgar Klingbeil, Ballston Lake, NY (US)

(73) Assignee: Transportation IP Holdings, LLC, Norwalk, CT (US)

( * ) Notice: Subject to any disclaimer, the term of this patent is extended or adjusted under 35 U.S.C. 154(b) by 309 days.

(21) Appl. No.: 17/646,131

(22) Filed: Dec. 27, 2021

(65) Prior Publication Data

US 2023/0202347 A1    Jun. 29, 2023

(51) Int. Cl.
| | |
|---|---|
| *B60L 58/40* | (2019.01) |
| *B60L 50/61* | (2019.01) |
| *B60L 50/75* | (2019.01) |
| *B60L 58/12* | (2019.01) |
| *B60L 58/16* | (2019.01) |
| *B60W 20/13* | (2016.01) |
| *F02B 69/04* | (2006.01) |

(52) U.S. Cl.
CPC ........... *B60L 58/40* (2019.02); *B60L 50/61* (2019.02); *B60L 50/75* (2019.02); *B60L 58/12* (2019.02); *B60L 58/16* (2019.02); *B60W 20/13* (2016.01); *F02B 69/04* (2013.01); *B60L 2240/547* (2013.01)

(58) Field of Classification Search
CPC .......... B60L 50/61; B60L 50/75; B60L 53/00; B60L 58/16; B60L 58/40; B60L 2240/547; B60W 20/13; B60W 2510/0623; B60W 2710/0627; F02B 69/04; F02B 19/0628
USPC ................................... 701/22, 104
See application file for complete search history.

(56) References Cited

U.S. PATENT DOCUMENTS

| | | | |
|---|---|---|---|
| 7,304,445 B2 * | 12/2007 | Donnelly | B60L 50/30 180/65.265 |
| 7,444,944 B2 * | 11/2008 | Kumar | B60L 50/61 105/26.05 |
| 8,413,589 B2 * | 4/2013 | Iden | B61C 5/00 105/35 |
| 8,554,383 B2 * | 10/2013 | Toba | H02J 3/46 700/297 |
| 9,008,879 B2 | 4/2015 | Kumar et al. | |
| 9,079,581 B1 * | 7/2015 | Li | B60L 58/24 |
| 9,099,699 B2 * | 8/2015 | Van Polen | H01M 8/188 |
| 9,522,671 B2 * | 12/2016 | Trippel | B60W 20/40 |
| 9,603,633 B2 * | 3/2017 | Puttlitz | A61B 17/7055 |
| 9,889,764 B2 * | 2/2018 | Yang | B60L 53/62 |
| 10,218,277 B2 * | 2/2019 | Carralero | H02M 3/33507 |
| 11,332,120 B2 * | 5/2022 | Hung | B60L 58/12 |
| 11,670,788 B2 * | 6/2023 | King | H02P 27/06 429/9 |

(Continued)

*Primary Examiner* — Andrew Joseph Rudy
(74) *Attorney, Agent, or Firm* — K&L Gates LLP

(57) ABSTRACT

Various methods and systems are provided for energy management at a consist. In one example, a method for the energy management includes coordinating a distribution of a power demand in response to a power output of each of a fuel cell system, a battery system, and an engine system. The power output of each of the fuel cell system, the battery system, and the engine system may be selected based on a respective efficiency of each system.

14 Claims, 9 Drawing Sheets

(56) References Cited

U.S. PATENT DOCUMENTS

| | | | |
|---|---|---|---|
| 11,821,375 B2* | 11/2023 | Klingbeil | F02D 19/021 |
| 2022/0266695 A1 | 8/2022 | Pressman et al. | |
| 2022/0271363 A1 | 8/2022 | Burkell et al. | |
| 2023/0202347 A1 | 6/2023 | Lavertu et al. | |
| 2023/0415791 A1* | 12/2023 | Pedder | B60W 20/40 |

* cited by examiner

ENERGY MANAGEMENT FOR MULTI-INPUT PROPULSION

BACKGROUND

Technical Field

Embodiments of the subject matter disclosed herein relate to energy management for a transportation system powered by more than one power device.

Discussion of Art

Transportation systems, such as trains, may be powered by more than one power system for propulsion. For example, a train may be propelled by one or more of an engine system, a battery system, and a fuel cell system, where each system may include more than one power device, e.g., a power storage device or a power-producing device, of a respective type. The engine system may be formed of one or more engines installed at rail vehicles, e.g., locomotive, of the train, the rail vehicles included in a consist. The engines may include various types of engine, such as single fuel combusting and multi-fuel combusting internal combustion engines. Similarly, the battery system and the fuel cell system may include one or more batteries and one or more fuel cell modules, respectively, located at one or more rail vehicles of the consist.

The consist may draw power from each power system individually, in some examples, and/or draw power from the power systems in combination. In one example, the consist may be equipped with each of the engine system, the battery system, and the fuel cell system and propulsion may be provided by the engine system alone, the battery system alone, or the fuel cell system alone in some operating modes. In other, hybrid operating modes, the battery system may be a primary power system supplemented by the engine system, the fuel cell system may be the primary power system supplemented by the battery system, the engine system may be the primary power system supplemented by each of the fuel cell system and the battery system, etc.

When configured with more than one power system for propulsion, each power system may be utilized solely based on its power capabilities without coordinated and strategy distribution of loads amongst the power systems. As an example, loads applied to each power system, and each power device of the system, may be selected based on a maximum power output of each power system. In this manner, the power systems may be operated outside of an efficiency and power capacity range specific to the power system type, which may expedite degradation of the power system and shorten its useful life. It may be desirable to have a system and method that differs from those that are currently available.

BRIEF DESCRIPTION

In one embodiment, a method for energy management of a transportation system includes coordinating a distribution of a power demand in response to a power output of each of a fuel cell system, a battery system, and an engine system. The power output of each of the fuel cell system, the battery system, and the engine system selected based on a respective efficiency of each system, which may be a desired efficiency level. In another example, the efficiency may be an optimal efficiency level relative to performance of the system with respect to energy usage. In this way, the fuel cell system, the battery system, and the engine system may be utilized in a strategic manner that reduces degradation of the systems while optimizing an overall energy efficiency of the transportation system.

In one example, in response to high power demands, an engine may be utilized as a primary power system, enabling operation of the engine within a high efficiency range of power output. Power from the engine may be supplemented by one or more of a fuel cell and a battery while maintaining a power output of the fuel cell within a high efficiency range and discharging the battery below a threshold discharge rate. In response to lower power demands, power may be provided primarily by the fuel cell and supplemented by one or more of the battery and engine. The power demand may therefore be divided amongst the fuel cell, the battery, and the engine according to a level of power requested as well as conditions enabling operating each of the power systems according to its respective optimal settings. The strategies described herein allows the power demand to be met while increasing fuel economy and minimizing carbon-based emissions.

DETAILED DESCRIPTION

Figure 1:
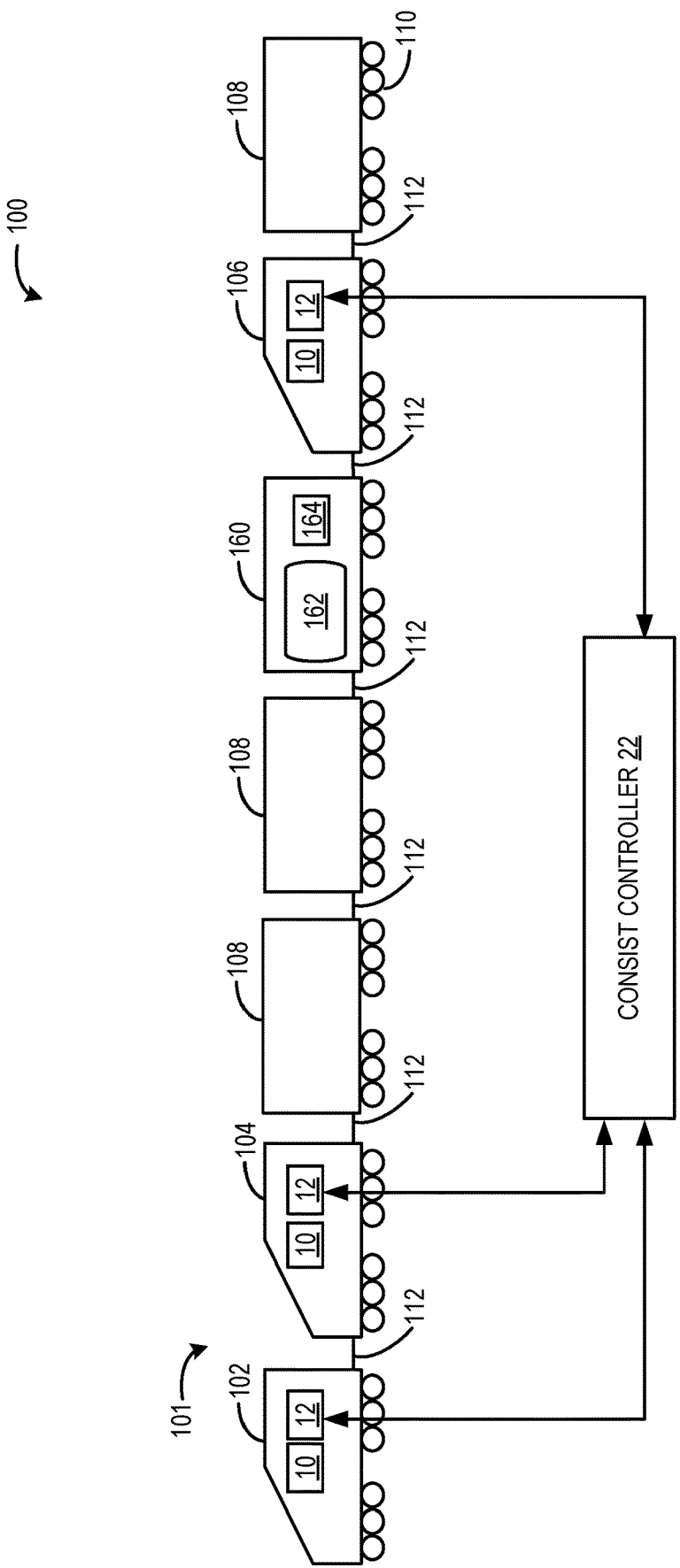
FIG. 1 shows an example embodiment of a train including a locomotive consist.

Embodiments of the invention are disclosed in the following description, and may relate to methods and systems for energy management of a transportation system. The transportation system, may, in one embodiment, be a consist formed of a plurality of vehicles, such as rail vehicles. Each of the rail vehicles may be a locomotive equipped with at least one power system for propelling the consist, including one or more of an engine system, a battery system, and a fuel cell system. Each power system includes one or more type of power device. For example, the engine system includes one or more engines, the battery system includes one or more batteries, and the fuel cell system includes one or more fuel cells.

In one embodiment each locomotive may be dedicated to a specific propulsion system. For example, one locomotive may include a single fuel (e.g., combusting one type of fuel) engine, one locomotive may carry the fuel cell system, and another locomotive may be equipped with a battery, and another locomotive may have a multi-fuel engine (e.g., combusting more than one type of fuel). In other embodiments, combinations of the power devices may be implemented at the locomotives, such as a locomotive equipped with an engine and a battery, a locomotive equipped with an engine and a fuel cell, and a locomotive equipped with a battery and a fuel cell. Furthermore, each locomotive of the consist may be differently configured from one another with respect to power devices. For example, one embodiment may include a consist having two locomotives each equipped with the engine system and one locomotive with a battery, or one locomotive with an engine, one locomotive with the fuel cell system and one locomotive with an engine and a battery, etc. Various combinations are possible but a strategy for energy management amongst the power systems may be similarly applied, as described herein.

The strategy for energy management includes coordinating operation of the power systems to optimize, e.g., operate each of the power systems to maximize an overall system efficiency of the transportation system, while prolonging a useful life of the power devices. More specifically, degradation to the battery system and fuel cell system may be reduced by moderating a charge/discharge rate of the battery and by operating the fuel cell system within a target power output range, respectively. Distribution of a load, e.g., an amount of power demanded to provide a desired power output, amongst the power systems may therefore be adjusted to enable operation of each power system at high efficiency and maintain an integrity of each power system. The load adjustment may, in one embodiment, rely on a determined trip plan. Trip conditions, such as terrain conditions, weather conditions, anticipated regions and duration of operation demanding high power vs lower power, etc., may be used to determine suitable operation of the power systems.

The technical effect of implementing the strategy for energy management at a consist as described herein is that losses leading to reduced efficiency of operation of the power systems is reduced while performances of each of the power systems is maintained higher over a longer duration of time.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, and other off-highway vehicles (OHV). On-road vehicles can include automobiles, buses, and semi-trucks. Off road vehicles can include mining equipment, marine vessels, rail vehicles, agricultural vehicles, and the like. For clarity of illustration, a locomotive is provided as an example of a mobile platform supporting a system incorporating an embodiment of the invention.

Before further discussion of the methods for energy management at a transportation system, an example transportation system platform in which the methods may be implemented is shown. FIG. 1 depicts an example train 100, including a plurality of rail vehicles 102, 104, 106, a fuel tender 160, and cars 108, that can run on a track 114. The plurality of rail vehicles, the fuel tender, and the cars are coupled to each other through couplers 112. In one example, the plurality of rail vehicles may be locomotives, including a lead locomotive and one or more remote locomotives. While the depicted example shows three locomotives and four cars, any appropriate number of locomotives and cars may be included in the train. Further, the locomotives in the train may form a consist. For example, in the embodiment depicted, the locomotives may form consist 101. Various vehicles may form vehicle groups (such as consists, convoys, swarms, fleets, platoons, and the like). The vehicles in a group may be coupled together mechanically and/or virtually.

In some examples, the consist may include successive locomotives, e.g., where the locomotives are arranged sequentially without cars positioned in between. In other examples, as illustrated in FIG. 1, the locomotives may be separated by one or more cars in a configuration enabling distributed power operation. In this configuration, throttle and braking commands may be relayed from the lead locomotive to the remote locomotives by a radio link or physical cable, for example.

The locomotives may be powered by an engine 10 (as well as by a battery, fuel, and/or a combination thereof, as described further below) while the cars may be unpowered. In one example, the engine may be a multi-fuel engine. For example, the engine may combust gaseous and/or liquid fuels with different amounts of carbon, and in varying ratios of the fuels relative to each other. In some examples, the multi-fuel engine may be specifically a dual-fuel engine to combust two fuels, either of which may be a gaseous or liquid fuel that is hydrocarbon or non-hydrocarbon based. In other examples, the engine may be a single-fuel engine that can combust a gaseous or a liquid fuel.

The train may include a control system. The control system may include at least one engine controller 12, and it may include at least one consist controller 22. As depicted in FIG. 1, each locomotive includes an engine controller. The engine controller may be in communication with the consist controller. The consist controller may be located on one vehicle of the train, such as the lead locomotive, or may be remotely located, for example, at a dispatch center. The consist controller may receive information from, and transmit signals to, each of the locomotives of the consist. For example, the consist controller may receive signals from a variety of sensors on the train and adjust train operations accordingly. The consist controller is also coupled to each engine controller for adjusting engine operations of each locomotive.

The train may include at least one fuel tender, which may carry one or more fuel storage reservoirs 162 and includes a controller 164. While the fuel tender is positioned in front of the remote locomotive 106, other examples may include alternate locations of the fuel tender along the train. For example, the fuel tender may be instead positioned behind the remote locomotive or between the lead locomotive and the remote locomotive, or behind the remote locomotive.

Figure 2:
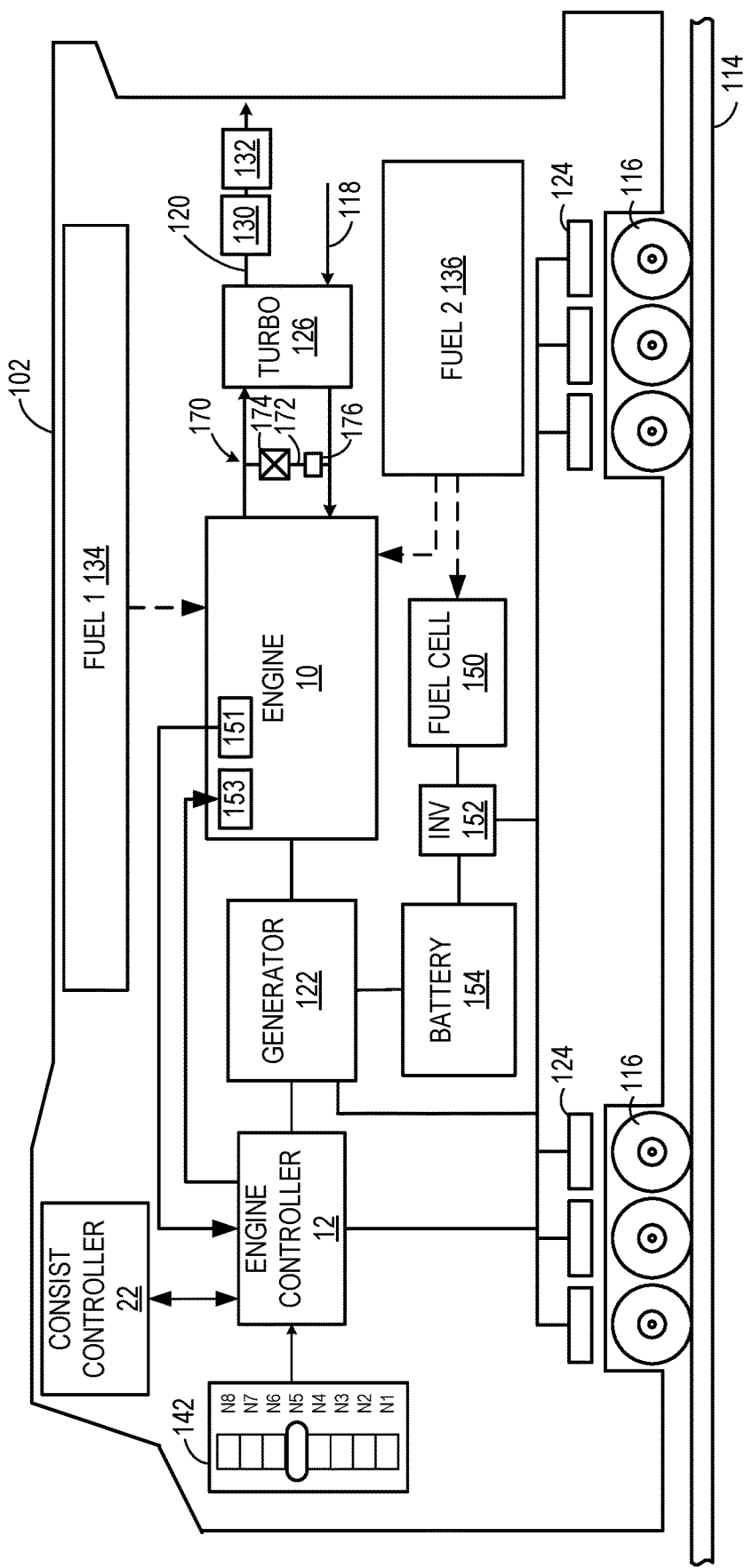
FIG. 2. shows a schematic diagram of an example embodiment of a locomotive from FIG. 1 with a dual fuel engine configured to combust hydrogen.

In one example, the fuel tender may be un-powered, e.g., without an engine or electric traction motors (e.g., electric traction motors 124 shown in FIG. 2). However, in other examples, the fuel tender may be powered for propulsion. For example, as shown in FIG. 2, the fuel tender may include an engine. The engine of the fuel tender may combust the fuel stored in the fuel storage reservoir and/or fuel stored at another vehicle of the train.

The fuel storage reservoir may have a suitable structure for storing a specific type of fuel. In one example, the fuel storage reservoir may be adapted for cryogenic storage of liquefied natural gas (LNG) or liquefied hydrogen. As another example, the fuel storage reservoir may be used to store a fuel in a liquid state at ambient temperature and pressure, such as diesel or ammonia. In yet another example, the fuel storage reservoir may store a fuel as a compressed gas, such as hydrogen or natural gas. In each instance, the fuel tender may be equipped with various mechanisms and devices for storage of the particular fuel. Further details of the fuel tender are shown further below, with reference to FIG. 3.

In some examples, fuel may be stored only at the fuel tender. In other examples, fuel may be stored both at the fuel tender and at one or more of the locomotives, e.g., as shown in FIG. 2. In addition, in some instances, the fuel tender may store a fuel cell system, including a fuel cell and one or more tanks of compressed hydrogen gas. Alternatively, the fuel cell system may be stored at one or more of the locomotives, as shown in FIG. 2.

FIG. 2 depicts an example embodiment of a locomotive as part of a train that can run on the track 114 via a plurality of wheels 116. Power for propulsion of the locomotive may be supplied at least in part by the engine. The engine receives intake air for combustion from an intake passage 118. The intake passage receives ambient air from an air filter (not shown) that filters air from outside of the locomotive. Exhaust gas resulting from combustion in the engine is supplied to an exhaust passage 120. Exhaust gas flows through the exhaust passage, and out of an exhaust stack (not shown) of the locomotive.

In one embodiment, the engine operates as a compression ignition engine. In another embodiment, the engine operates as a spark ignition engine. The engine may combust one specific fuel type only or may be able to combust two or more types of fuel, e.g., a multi-fuel engine. As such, the different fuel types may be combusted individually or co-combusted, e.g., combusted concurrently, at the engine. In one embodiment, the multi-fuel engine may be a dual-fuel engine. As depicted in FIG. 2, the dual fuel engine may receive a first fuel from a first fuel reservoir 134 and a second fuel from a second fuel reservoir 136.

While the locomotive is equipped with two fuel reservoirs in FIG. 2, in other examples, the locomotive may include only one fuel reservoir or no fuel reservoir. For example, at least one of the fuel reservoirs may be stored at the fuel tender, e.g., the fuel tender 160 of FIG. 1. Alternatively, at least one additional fuel, e.g., a third fuel, may be stored at the fuel tender in addition to the first fuel at the first fuel reservoir and the second fuel at the second fuel reservoir of the locomotive. In one example, fuels which may be stored at ambient pressure and temperature without any additional equipment or specialized storage tank configurations, such as diesel, may be stored at the locomotive. Fuels demanding specialized equipment, such as for cryogenic or high pressure storage, may be stored on-board the fuel tender. In other examples, however, the locomotive and the fuel tender may each store fuels that do not demand specialized equipment.

The first, second, and third fuels (e.g., any fuels stored on-board the train) may each be any of a number of different fuel types. For example, the types of fuel may include hydrocarbon-based fuels, such as diesel, natural gas, methanol, ethanol, other alcohols, dimethyl ether (DME), other ethers, biodiesel, HDRD, syn-gas, etc. Alternatively, the fuels may be non-hydrocarbon-emitting fuels, such as hydrogen, ammonia, etc. The fuels listed above are non-limiting examples of fuels which may be combusted at the engine and various other types of fuels are possible.

Additionally, each of the stored fuels may be a gaseous or a liquid phase fuel. Thus, when configured as a compression ignition engine combusting a single fuel type, the engine may consume a gaseous fuel or a liquid fuel. When the compression ignition engine is a multi-fuel engine, the engine may combust only liquid fuels, only gaseous fuels, or a combination of liquid and gaseous fuels. Similarly, when configured as a spark ignition engine combusting a single fuel type, the engine may also consume either a gaseous fuel or a liquid fuel. When configured as a multi-fuel spark ignition engine, the engine may combust only liquid fuels, only gaseous fuels, or a combination of liquid and gaseous fuels.

As either of the spark ignition or the compression ignition multi-fuel engine configurations, the engine may combust fuel combinations in different manners. For example, one fuel type may be a primary combustion fuel and another fuel type may be a secondary, additive fuel used under certain conditions to adjust combustion characteristics. For example, during engine startup, a fuel combustion mixture may include a smaller proportion of diesel to seed ignition while hydrogen may form a larger proportion of the mixture. In other examples, one fuel may be used for pilot injection prior to injection of the primary combustion fuel. In some examples, the substitution rate may be set based on one or more conditions to increase an amount of carbon-free fuel to decrease carbon emissions. A ratio of carbon-free fuels used may be adjusted based on a desired ignition timing, wherein the desired ignition timing is based on one or more of an engine load, an intake manifold temperature and pressure, and a combustibility of the fuel mixture.

The engine, as the multi-fuel engine, may combust various combinations of the fuels and the fuels may be premixed or not premixed prior to combustion. In one example, the first fuel may be hydrogen and the second fuel may be diesel. In another example, the first fuel may be ammonia and the second fuel may be diesel. In yet another example, the first fuel may be ammonia and the second fuel may be ethanol. Further combinations are possible with storage of the third fuel on the fuel tender. For example, LNG may be stored at the fuel tender and the engine may combust LNG and hydrogen, or LNG, diesel, and hydrogen, or LNG, ammonia, and hydrogen. As such, numerous combinations of fuel types are possible, where the combinations may be determined based on compatibility of the fuels. A method of delivery of the fuels to the engine for combustion may similarly depend on properties of the fuel type.

When the engine is the single fuel-combusting engine (either spark ignition or compression ignition), the engine may consume a single liquid phase fuel. For example, the engine may combust diesel, hydrogen, ammonia, LNG, or another liquid phase fuel. Similarly, the engine may combust a single gaseous fuel, such as hydrogen, or another gaseous fuel.

A fuel that is stored on-board in one physical state, e.g., gas or liquid, may be delivered to the engine in the same state or a different state. For example, LNG may be stored cryogenically in the liquid phase but may undergo a transition to the gas phase, e.g., at a regasification unit in the fuel tender, prior to injection at the engine. Other fuels, however, may be stored as a liquid and injected as a liquid or stored as a gas and injected as a gas.

Fuels may be injected at the engine according to more than one injection technique, for example. In one example, one or more of the fuels may be delivered to the engine cylinders via an indirect injection method, such as port injection. In another example, at least one of the fuels may be introduced to the engine cylinders via direct injection. In yet another example, at least one of the fuels may be injected by central manifold injection. The engine may receive the fuels exclusively by indirect injection, exclusively by direct injection, or by a combination of indirect and direct injection. As one example, the fuels may be injected via port injection during low loads and by direct injection during high loads. In particular, when one of the fuels is a gaseous fuel, premixing of the gaseous fuel may be desirable via port injection. The fuels may also be premixed when introduced by central manifold injection. Premixing by direct injection is possible, such as by injection of the gaseous fuel during an intake stroke of the engine cylinders. Additionally or alternatively, a location of injection of one or more fuels may be based on a combustibility of a fuel. For example, ammonia may be injected indirectly and premixed with boost air and/or EGR to enhance the combustibility and vaporization thereof.

Each type of injection may include injection of either gaseous or liquid phase fuels. However, some injection methods may be more suitable for certain fuels depending on specific properties of the fuel type. For example, hydrogen may be injected by port injection or direct injection. Liquid phase fuels, such as diesel, may be injected by direct injection. Ammonia and natural gas may each be selectively injected by port injection or direct injection. Similarly, fuels such as methanol and ethanol may be either port injected or direct injected. In some instances, the engine may have fuel injectors capable of switching between injection of gaseous fuels and of liquid fuels.

The fuels combusted by the dual fuel engine may or may not be premixed prior to combustion whether the fuels are in the gas or liquid phases. For example, depending on operating conditions, premixing of hydrogen, natural gas, ammonia, methanol, ethanol, and DME may be desirable. For example, a greater magnitude of premixing hydrogen may be desired at lower loads and a lower magnitude of premixing hydrogen may be desired at higher loads. During other operating conditions, fuels such as diesel, hydrogen, natural gas, methanol, and ethanol may not be premixed. Premixing of the fuels may include port injection of at least one of the fuels into an inlet manifold or inlet port where the fuel may mix with air before entering a cylinder. As another example, each of the fuels may be port injected, allowing the fuels to mix with one another and with air prior to combustion. In other examples, the fuel(s) may be injected into a pre-combustion chamber fluidically coupled to a cylinder head where the fuel(s) may mix with air in the pre-combustion chamber before flowing to the cylinder head.

Alternatively, as described above, the fuels may be delivered to the engine cylinders by directly injecting one or more fuels into the engine cylinders when the cylinders are filled with at least the compressed air and, in some instances, the gas phase fuel. Direct injection may include high pressure direct injection (HPDI) and low pressure direct injection (LPDI). When direct injected, the fuels may not be premixed, in one example. However, in another example, premixing may be enabled by direct injection of one or more of the fuels prior to a compression stroke of the engine cylinders, as described above.

The engine is coupled to an electric power generation system, which includes an alternator/generator 122 and electric traction motors 124. For example, the engine generates a torque output that is transmitted to the alternator/generator which is mechanically coupled to the engine. The alternator/generator produces electrical power that may be stored and applied for subsequent propagation to a variety of downstream electrical components. As an example, the alternator/generator may be electrically coupled to a battery 154. The battery may store the electrical power produced by the alternator/generator when the alternator generator operates in a generator mode. As another example, the alternator/generator may be electrically coupled to the electric traction motors and the alternator/generator may provide electrical power to the electric traction motors. As depicted, the electric traction motors are each connected to one of a plurality of wheels 116 to provide tractive power to propel the locomotive. One example locomotive configuration includes one traction motor per wheel. As depicted herein, six pairs of traction motors correspond to each of six pairs of wheels of the locomotive.

The locomotive may have one or more turbochargers 126 arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown) which is at least partially driven by a turbine (not shown). While in this case a single turbocharger is included, the system may include multiple turbine and/or compressor stages. Further, in some embodiments, a wastegate may be provided which allows exhaust gas to bypass the turbocharger. The wastegate may be opened, for example, to divert the exhaust gas flow away from the turbine. In this manner, the rotating speed of the compressor, and thus the boost provided by the turbocharger to the engine may be regulated.

The locomotive may include an exhaust gas recirculation (EGR) system 170. The EGR system may route exhaust gas from the exhaust passage upstream of the turbocharger to the intake passage downstream of the turbocharger. The EGR system includes an EGR passage 172 and an EGR valve 174 for controlling an amount of exhaust gas that is recirculated from the exhaust passage of the engine to the intake passage of the engine. By introducing exhaust gas to the engine, the amount of available oxygen for combustion is decreased, thereby reducing the combustion flame temperatures and reducing the formation of nitrogen oxides (e.g., NOx). The EGR valve may be an on/off valve controlled by the locomotive controller, or it may control a variable amount of EGR, for example.

The EGR system may further include an EGR cooler 176 to reduce the temperature of the exhaust gas before it enters the intake passage. As depicted in the non-limiting example embodiment of FIG. 2, the EGR system is a high-pressure EGR system. In other embodiments, the locomotive may additionally or alternatively include a low-pressure EGR system, routing EGR from a location downstream of the turbocharger to a location upstream of the turbocharger. Additionally, the EGR system may be a donor cylinder EGR system where one or more cylinders provide exhaust gas only to the EGR passage, and then to the intake.

The locomotive may include an exhaust gas treatment system coupled in the exhaust passage to reduce regulated emissions. In one example embodiment, the exhaust gas treatment system may include a diesel oxidation catalyst (DOC) 130 and a diesel particulate filter (DPF) 132. The DOC may oxidize exhaust gas components, thereby decreasing carbon monoxide, hydrocarbons, and particulate matter emissions. The DPF can trap particulates, also known as particulate matter (an example of which is soot), produced during combustion, and may be ceramic, silicon carbide, or a suitable material. In other embodiments, the exhaust gas treatment system may additionally include a selective catalytic reduction (SCR) catalyst, three-way catalyst, NOx trap, various other emission control devices or combinations thereof. In some embodiments, the exhaust gas treatment system may be positioned upstream of the turbocharger, while in other embodiments, the exhaust gas treatment system may be positioned downstream of the turbocharger.

In some examples, as shown in FIG. 2, the electric traction motors may additionally receive electrical energy from a fuel cell power module 150. The fuel cell power module may include a fuel cell stack that receives hydrogen from one of the fuel reservoirs. The fuel cell power module may receive the second fuel from the second fuel reservoir when the second fuel is hydrogen. In other examples, the fuel cell power module may instead receive fuel from the first fuel reservoir or from the one or more fuel reservoirs of the fuel tender (e.g., of FIG. 3).

Electrical energy generated by the fuel cell power module 150 may be transmitted to a traction inverter 152 which may convert the electrical energy for use by the electric traction motors. For example, the traction inverter may enable direct current (DC) power to alternating current (AC) power conversion. The traction inverter may be electrically coupled to other electrical components of the locomotive that are not shown in FIG. 2 for brevity. For example, the traction inverter may convert electrical electricity delivered to and from an electrical storage device, such as the battery.

In some examples, the engine and the battery may be included in a hybrid engine system where the electric traction motors may be powered by both the engine and the battery. The battery may be used to both energize the electric traction motors and to store energy captured during, for example, regenerative braking operations, such as dynamic braking. In yet other examples, the hybrid engine system may also include the fuel cell power module, and power for vehicle propulsion may be provided by each of the engine, the battery, and the fuel cell power module individually or in various combinations. For example, the hybrid engine system may be operated in an engine-only mode, a battery-only mode, a fuel cell-only mode, or obtain power from a power-split operation mode including combined power delivery from the engine and battery, from the engine and fuel cell, etc.

Although the locomotive is illustrated in FIG. 2 equipped with more than one power source for propulsion, e.g., for energizing the electric traction motors, including the engine, fuel cell module, and battery, other examples may include fewer power devices than depicted thereat. For example, the engine may be located at a first locomotive of the consist, the fuel cell module at a second locomotive, and the battery at a third locomotive. In other examples, the first locomotive may include both the engine and battery, or both the fuel cell module and the battery, or both the fuel cell module and the battery. Each locomotive of the consist may therefore include a different or same configuration of power devices as the other locomotives of the consist.

The locomotive may further include a throttle 142 coupled to the engine to indicate power levels. In this embodiment, the throttle is depicted as a notch throttle. However, any suitable throttle is within the scope of this disclosure. Each notch of the notch throttle may correspond to a discrete power level. The power level indicates an amount of load, or engine output, placed on the locomotive and controls the speed at which the locomotive will travel. Although eight notch settings are depicted in the example embodiment of FIG. 2, in other embodiments, the throttle notch may have more than eight notches or less than eight notches, as well as notches for idle and dynamic brake modes. In some embodiments, the notch setting may be selected by a human operator of the locomotive. In other embodiments, the consist controller may determine a trip plan (e.g., a trip plan may be generated using trip optimization software, such as Trip Optimizer system (available from Wabtec Corporation) and/or a load distribution plan may be generated using consist optimization software such as Consist Manager (available from Wabtec Corporation) including notch settings based on engine and/or locomotive operating conditions, as will be explained in more detail below.

The engine controller may control various components related to the locomotive. As an example, various components of the locomotive may be coupled to the engine controller via a communication channel or data bus. In one example, the engine controller and the consist controller each include a computer control system. The engine controller and the consist controller may additionally or alternatively include a memory holding non-transitory computer readable storage media (not shown) including code for enabling on-board monitoring and control of locomotive operation. The engine controller may be coupled to the consist controller, for example, via a digital communication channel or data bus.

Both the engine controller and the consist controller may receive information from a plurality of sensors and may send control signals to a plurality of actuators. The engine controller, while overseeing control and management of the locomotive, may receive signals from a variety of engine sensors 151, as further elaborated herein, in order to determine operating parameters and operating conditions, and correspondingly adjust various engine actuators 153 to control operation of the locomotive. For example, the engine controller may receive signals from various engine sensors including, but not limited to, engine speed, engine load, intake manifold air pressure, boost pressure, exhaust pressure, ambient pressure, ambient temperature, exhaust temperature, engine temperature, exhaust oxygen levels, etc. Correspondingly, the engine controller may control the locomotive by sending commands to various components such as the electric traction motors, the alternator/generator, cylinder valves, fuel injectors, the notch throttle, etc. Other actuators may be coupled to various locations in the locomotive.

The consist controller may include a communication portion operably coupled to a control signal portion. The communication portion may receive signals from locomotive sensors including locomotive position sensors (e.g., GPS device), environmental condition sensors (e.g., for sensing altitude, ambient humidity, temperature, and/or barometric pressure, or the like), locomotive coupler force sensors, track grade sensors, locomotive notch sensors, brake position sensors, etc. Various other sensors may be coupled to various locations in the locomotive. The control signal portion may generate control signals to trigger various locomotive actuators. Example locomotive actuators may include air brakes, brake air compressor, traction motors, etc. Other actuators may be coupled to various locations in the locomotive. The consist controller may receive inputs from the various locomotive sensors, process the data, and trigger the locomotive actuators in response to the processed input data based on instruction or code programmed therein corresponding to one or more routines. Further, the consist controller may receive engine data (as determined by the various engine sensors, such as an engine coolant temperature sensor) from the engine controller, process the engine data, determine engine actuator settings, and transfer (e.g., download) instructions or code for triggering the engine actuators based on routines performed by the consist controller back to the engine controller.

For example, the consist controller may determine a trip plan to distribute load amongst all locomotives in the train, based on operating conditions. In some conditions, the consist controller may distribute the load unequally, that is, some locomotives may be operated at a higher power setting, or higher notch throttle setting, than other locomotives. The load distribution may be based on a plurality of factors, such as fuel economy, coupling forces, tunneling operating, grade, etc. In one example, the load distribution may be adapted based on a distribution of the locomotive consist, e.g., a positioning of each of the locomotives of the locomotive consist, across the train. For example, at least one locomotive may be positioned at an end of the train and at least one locomotive may be positioned at a front of the train. The locomotive at the end of the train may push propulsion of the train and the locomotive at the front of the train may pull the train, particularly during uphill navigation. As such, a greater load may be placed on the pushing locomotive at the end of the train.

Furthermore, in some examples, the consist controller may assess fuel consumption by power systems of the train, e.g., an engine system, a battery system, and/or a fuel cell system, to select a trip plan. The trip plan may follow a route that reduces fuel consumption by the train. Additionally, in instances where the engine system includes a multi-fuel engine, the trip plan may be selected to enable specific fuels to be preferentially combusted, thereby increasing fuel efficiency and/or decreasing emissions.

Figure 3:
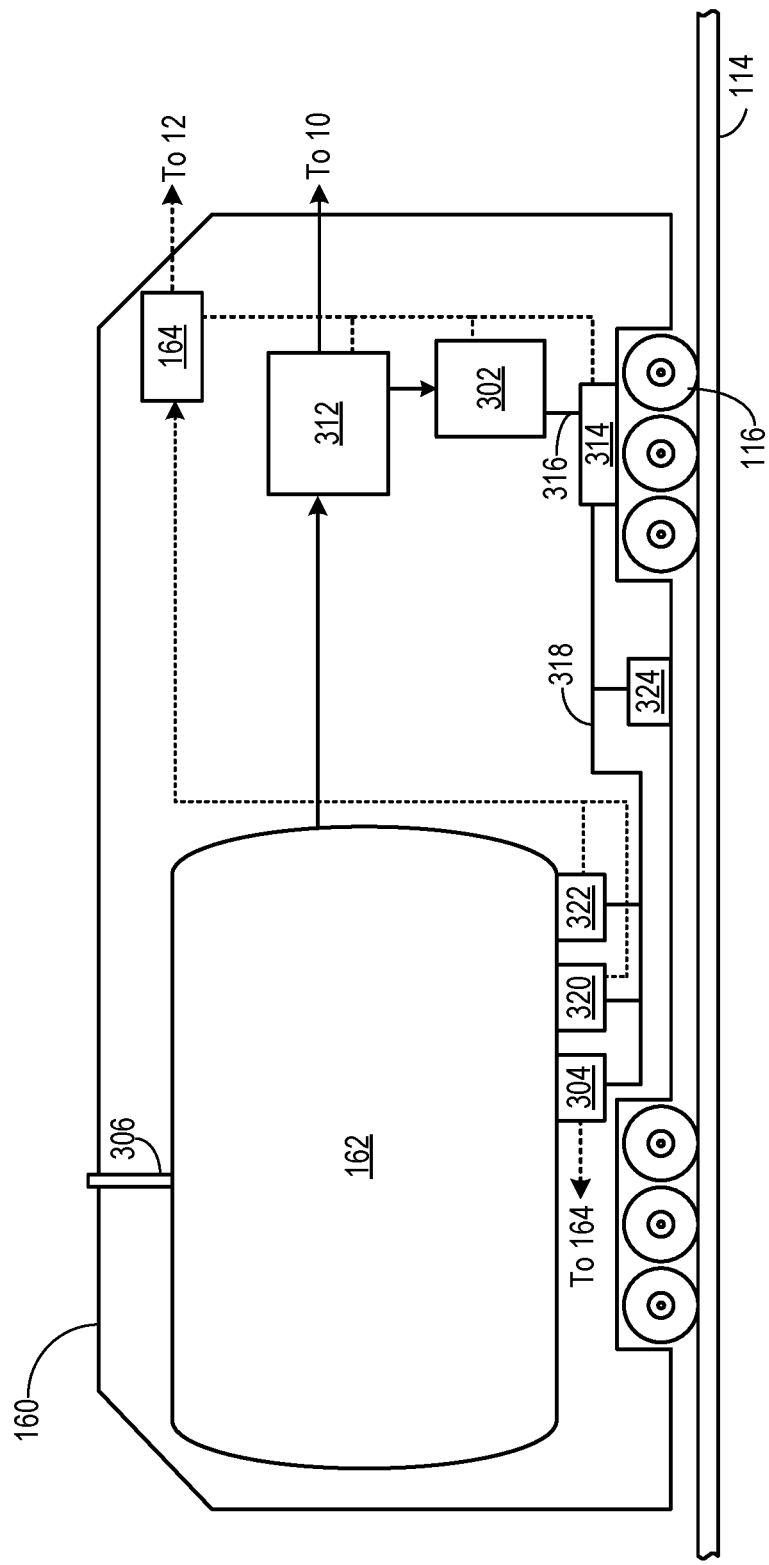
FIG. 3 shows an example embodiment of a fuel tender which may be included in the train of FIG. 1.

Turning now to FIG. 3, an embodiment of the fuel tender 160 of FIG. 1 is shown. As described above, the fuel tender includes the fuel storage reservoir, the controller 164, and an engine 302. The fuel tender may further include a first unit 304, which may be a device for controlling a temperature and pressure within the fuel storage reservoir. For example, when liquified hydrogen or LNG is stored in the fuel storage reservoir, the first unit may be a cryogenic unit. The fuel storage reservoir sizes and configurations may be selected based on end use parameters, may be removable from the fuel tender, and may be receive fuel from an external refueling station via port 306.

The fuel storage reservoir may supply fuel to a fuel modification unit 312. The fuel modification unit may adjust a characteristic of the fuel. For example, the fuel may be converted from a liquid phase to a gas phase at the fuel modification unit, such as when the fuel is LNG. As another example, the fuel modification unit may be a pump to adjust a delivery pressure of the fuel when the fuel is stored in the gas phase. In other examples, where fuel modification is not demanded, the fuel modification unit may be omitted. The fuel may be delivered from the fuel modification unit to engines of the locomotives.

By supplying fuel from the fuel storage reservoir to the locomotive engines and the engine of the fuel tender, the fuel may be combusted by the engines distributed across the train. In another non-limiting embodiment, the fuel tender engine may generate electricity that may be delivered to one or more components on-board the fuel tender and/or on-board the locomotives. In one example, as depicted in FIG. 3, the fuel tender engine may generate torque that is transmitted to a power conversion unit 314 via drive shaft 316. The power conversion unit may convert the torque into electrical energy that is delivered via electrical bus 318 to a variety of downstream electrical components in the fuel tender. Such components may include, but are not limited to, the first unit, the fuel modification unit, the controller, a pressure sensor 320, a temperature sensor 322, batteries 324, various valves, flow meters, additional temperature and pressure sensors, compressors, blowers, radiators, batteries, lights, on-board monitoring systems, displays, climate controls, and the like, some of which are not illustrated in FIG. 3 for brevity. Additionally, electrical energy from the electrical bus may be provided to one or more components of the locomotives.

In one example the power conversion unit includes an alternator (not shown) that is connected in series to one or more rectifiers (not shown) that convert the alternator's AC electrical output to DC electrical power prior to transmission along the electrical bus. Based on a downstream electrical component receiving power from the electrical bus, one or more inverters may invert the electrical power from the electrical bus prior to supplying electrical power to the downstream component. In one example, a single inverter may supply AC electrical power from a DC electrical bus to a plurality of components. In another non-limiting embodiment, each of a plurality of distinct inverters may supply electrical power to a distinct component.

The controller on-board the fuel tender may control various components on-board the fuel tender, such as the fuel modification unit, the fuel tender engine, the power conversion unit, the first unit, control valves, and/or other components on-board the fuel tender, by sending commands to such components. The controller may also monitor fuel tender operating parameters in active operation, idle and shutdown states. Such parameters may include, but are not limited to, the pressure and temperature of the fuel storage reservoir, a pressure and temperature of the fuel modification unit, the fuel tender engine temperature, pressure, and load, compressor pressure, heating fluid temperature and pressure, ambient air temperature, and the like. In one example, the fuel tender controller may execute code to auto-stop, auto-start, operate and/or tune the engine and the fuel modification unit in response to one or more control system routines. The computer readable storage media may execute code to transmit to and receive communications from the engine controllers on-board the locomotives.

The fuel tender depicted in FIG. 3 is a non-limiting example of how the fuel tender may be configured. In other examples, the fuel tender may include additional or alternative components. As an example, the fuel tender may further include one or more additional sensors, flow meters, control valves, various other devices and mechanisms for controlling fuel delivery and storage conditions, etc.

As described above, a transportation system, such as a train, may include multiple power systems for propulsion. The power systems may be one or more of an engine system, a battery system, and a fuel cell system, installed at various locations of a consist of the train. Each system may include one or more power devices, such as an engine, a battery, and a fuel cell (e.g., fuel cell module), respectively. When power is regularly drawn from the power system at maximum power capacity, such as during operation at high loads, a power system may be used under conditions outside of its optimal operating range. As one example, frequent cycling of a battery between full charge and charge depletion at high charge/discharge rates may accelerate loss of cycling capacity. Operation of a fuel cell system at maximum power generation may degrade a performance of a fuel cell module at a faster rate. As a result, a useful life of such power systems may be curtailed, leading to more frequent maintenance and replacement.

In one example, the issues described above may be at least partially addressed by strategically operating the power systems in a coordinated manner to enable each power system to be operated according to a high efficiency output from the power system. The high efficiency output may represent operation of the power system source at load levels facilitating power provision with minimal losses, preservation and prolonging of a performance of the power system, as well as enabling a power demand to be met while minimizing release of carbon-based emissions. Furthermore, in some instances, a determined trip plan, as stored at a controller such as the consist controller depicted in FIG. 2, may be used to optimize operation of the power systems while accounting for the individual operating characteristics of the power systems.

Figure 4:
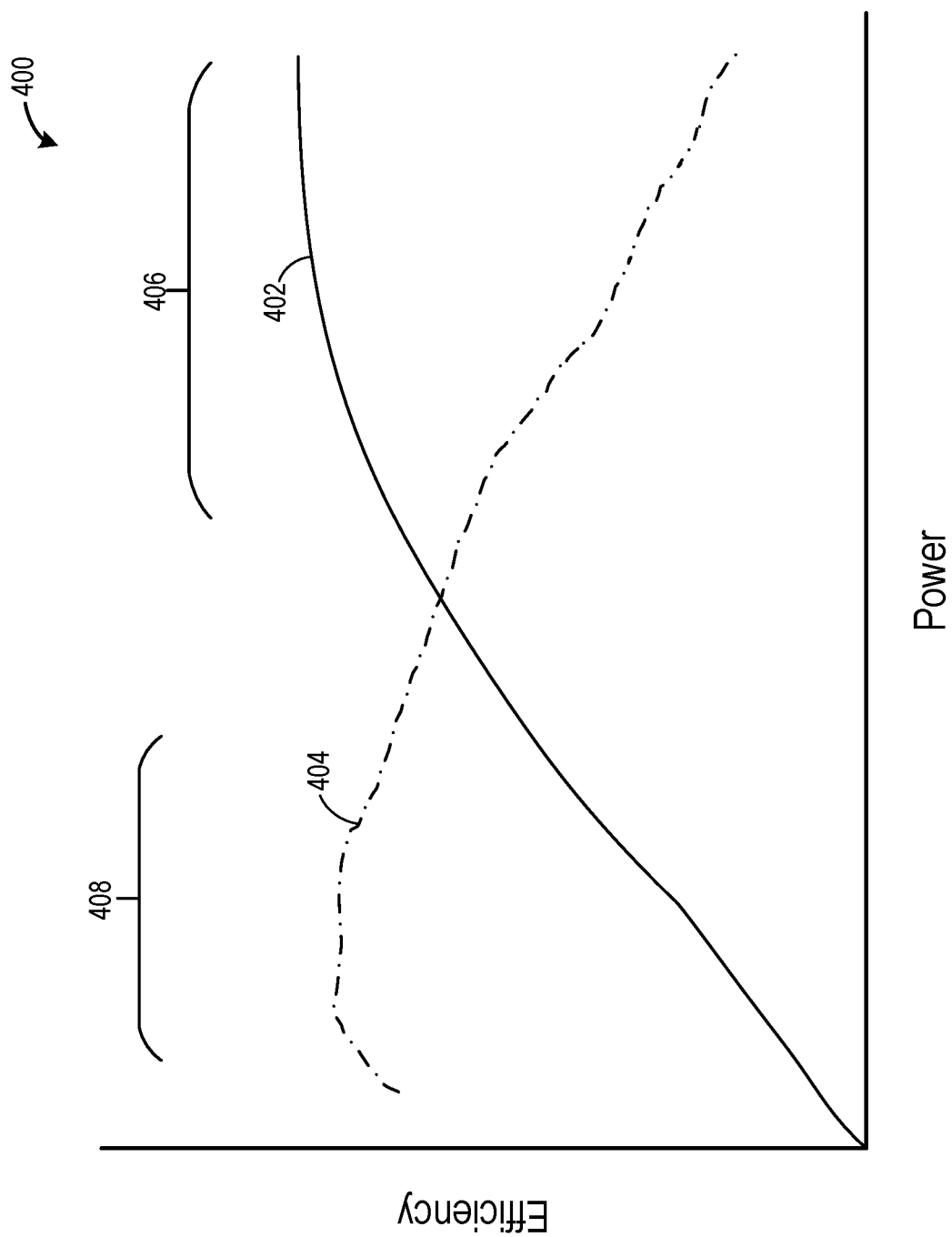
FIG. 4 shows a first graph plotting a relationship between efficiency and power output for an engine and a fuel cell, which may each be included in the locomotive consist of FIG. 1.

An efficiency of the power systems may demonstrate different dependencies on load. For example, an amount of power provided by a battery may depend on a discharge rate of the battery, and therefore does not exhibit variations in efficiency according to power. In contrast, operation of a fuel cell and an engine at their respective maximum efficiencies may correspond to specific and different power output ranges. Efficiencies of an engine and a fuel cell is shown in FIG. 4 in a graph 400 depicting efficiency (e.g., percent efficiency) relative to power output. Efficiency increases upward along the y-axis and power output increases to the right along the x-axis.

Efficiency of the respective power system may exemplify operation of the power system with minimal losses (e.g., electrical and/or mechanical). The graph includes a first plot 402, representing an efficiency curve of an engine, e.g., an internal combustion engine, and a second plot 404, representing an efficiency curve of a fuel cell. A high efficiency range, e.g., efficiencies above a first threshold efficiency such as 40%, of the engine relative to power output is indicated by region 406, and a high efficiency range of the fuel cell, e.g., efficiencies above a second threshold efficiency such as above 50%, relative to load level is indicated by region 408. The high efficiency range of the engine may correspond to a power output range of about 70%-100% of a rated power of the engine and the high efficiency range of the fuel cell may correspond to a power output range of about 20%-40% of a rated power of the fuel cell.

As shown in the graph, the high efficiency range of the engine occurs at high power output while the high efficiency range of the fuel cell occurs at low power output, e.g., lower than the high efficiency range of the engine. As such, each of the battery and the fuel cell may be preferentially operated at their respective high efficiency ranges when allowable based on an overall power demand for operation of a train. Operation of the fuel cell at the high efficiency range (e.g., low-mid power output/load) may extend a life of the fuel cell. If present in a consist, a battery may be used to provide supplementary power when a combined power output resulting from high efficiency operation of the fuel cell and the battery falls short of the overall power demand.

Figure 5:
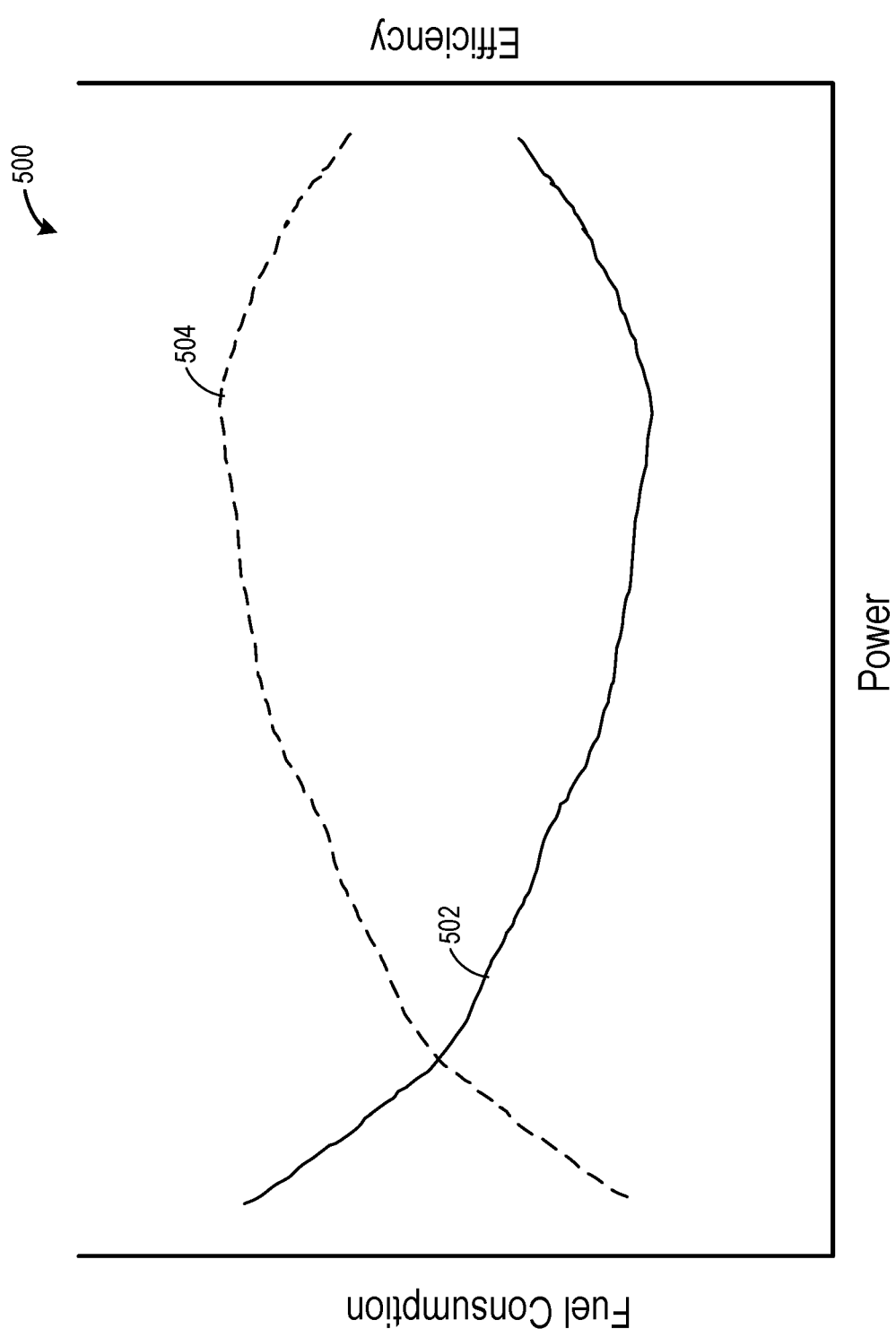
FIG. 5 shows a second graph plotting a relationship between fuel consumption, efficiency, and power output of the engine.

High efficiency operation of the engine at high power output also corresponds to increased fuel efficiency of the engine. As shown in FIG. 5, a graph 500 depicts a first plot 502 of fuel consumption relative to power output for the engine and a second plot 504 of engine efficiency, e.g., similar to the first plot 402 of FIG. 4. Fuel consumption at the engine increases upwards along the y-axis and power output increases to the right along the x-axis. The second plot 504 shows engine efficiency peaking when fuel consumption is lowest. When fuel consumption is lowered, emissions resulting from combustion of fuel may also be reduced. Thus, if the engine burns carbon-based fuels, carbon-based emissions are decreased and, as such, operation of the engine at the high efficiency range is desirable.

For the engine and the fuel cell, operation at different loads may be requested based on a notch setting of a notch throttle, as described above. As the notch setting is increased, higher power output is demanded from power systems of the consist where power outputs of each of the power systems may be varied according to the demand. For the battery, as described above, the power output is set by the discharge rate of the battery. Without constraining the discharge (and charging) rate of the battery, high power demands may lead to increases in the discharge rate and frequency at which the battery is charged and discharged. Faster discharge rates, such as greater than about 1 C, and increased cycling of the battery may accelerate loss of capacity and degrade battery performance.

In one embodiment, the power demand, as indicated based on the notch setting, may be divided evenly amongst the power systems. For example, when the consist includes the engine, the battery, and the fuel cell and the overall consist power demand is 9000 hp, each of the power systems may contribute a power output providing 3000 hp. The even division of the power demand may result in the engine operating below its maximum efficiency range, the fuel cell operating above its maximum efficiency range, and the battery discharging and/or cycling at a fast rate. In addition to reduced operating efficiencies of the engine and fuel cell, degradation of the fuel cell and the battery may be expedited, fuel efficiency may be reduced, and carbon-based emissions may be increased.

In an alternate embodiment, as described herein, power output from each of the power systems may be strategically coordinated to operate the engine and the fuel cell within their respective high efficiency ranges as well as reducing cycling of the battery and maintaining the battery discharge rate below a threshold discharge rate. For example, an imposed load (e.g., a power demand) may be unevenly distributed across the power systems according to their respective optimal operating settings. For a high power demand/high load, such as above 1500 hp when the locomotive has a power rating of 4500 hp and includes a large engine and smaller, supporting power devices, a large proportion (e.g., more than a third) of the load may be directed to the engine, thus operating the engine within its high efficiency range, as shown in FIG. 4. A smaller proportion of the load may be directed to the supporting power devices, e.g., the fuel cell, allowing the fuel cell to operate within its high efficiency range. If the power output provided by high efficiency operation of the fuel cell does not satisfy the power demand, supplemental power may be drawn from another supporting power device, e.g., the battery, which may allow the discharge rate to remain below the threshold discharge rate.

A division of power amongst the power devices in response to a high demand for power may vary depending on a configuration of the power systems onboard the locomotive. As described above, the engine may receive a larger proportion of the load when the engine is the largest power device onboard the locomotive. In other examples, however, a primary power device, e.g., the power device used predominantly for a specific locomotive power configuration, may not receive a largest proportion of the load and a remaining, unmet portion of the power demand may be addressed by the other, supporting power devices. The largest power device may be the fuel cell, in a fuel cell locomotive, that includes the engine for support and also draw power from the battery for supplemental power. A largest proportion of the load may be directed to the engine upon fulfilling a target power output from the fuel cell despite a primary role of the fuel cell. As another example, the locomotive may be a battery locomotive where the battery may have a high power rating, e.g., relative to an engine located on another locomotive of the consist, and a large proportion of the power demand may be met by the battery with support from power devices on other locomotives.

At lower power demands/loads, e.g., loads lower than 1500 hp, as an example, operation of the fuel cell at its optimal efficiency range may be prioritized. Power delivered from the fuel cell may be supplemented by power from one or more of the engine and the battery while maintaining operating parameters of each of the engine and the battery within target settings. For example, if the engine is a multi-fuel engine configured to combust a primary, carbon-based fuel and a secondary, non-carbon fuel, a target setting for the multi-fuel engine may include maintaining a high substitution rate (e.g., substitution of the secondary fuel for the primary fuel) of a combusted fuel mixture. A target setting for the battery may be determined by the discharge rate, such as maintaining the discharge below 1 C. A magnitude of the discharge rate may be selected based on the power shortfall addressed by the battery, given that the battery can be discharged at a rate below the threshold discharge rate. Other conditions of the power systems, such as an age, history of cycling frequency of the battery, anticipated availability of charging events (e.g., according to a trip plan), and a duty cycle, age, maximum power rating, expected availability of charging stations (e.g., according to the trip plan) of the fuel cell, may affect distribution of the power demand amongst the power systems.

In some examples, an engine system of the consist may include more than one engine, each engine located at a different locomotive of the consist. The more than one engine may include a single fuel engine, which may combust one fuel, and the multi-fuel engine, as described above. In one embodiment, the single fuel engine may burn diesel and the multi-fuel engine may burn a fuel mixture, including carbon-based fuels and non-carbon fuels, as described above. When the multi-fuel engine is configured to burn the carbon-based fuel as the primary fuel, and the non-carbon fuel as a secondary fuel, substituting at least a portion of the primary fuel by the secondary fuel may decrease carbon emissions relative to combustion of only the primary fuel. As the substitution ratio, e.g., an amount of the secondary fuel that replaces at least a portion of the primary fuel, increases, carbon emissions may decrease accordingly. Depending on characteristics of the primary fuel and the secondary fuel, such as gravimetric density, volumetric density, phase (e.g., gas vs. liquid), energy density, flame speed, ignition temperature, etc., a power output and combustion efficiency from combustion of the fuel mixture may differ relative to combustion of the single fuel.

For example, when the primary fuel is diesel and the secondary fuel is hydrogen, emission of hydrocarbons may be suppressed by increasing the substitution ratio of hydrogen for diesel. However, increasing a proportion of hydrogen in the fuel mixture may increase a likelihood of knock. At engine operation under high loads, the higher tendency for knock to occur resulting from combustion of hydrogen may demand a decrease in the substitution ratio. Thus, operation of the engine may be further modulated based on maximizing the substitution ratio without causing autoignition and knock.

Figure 6:
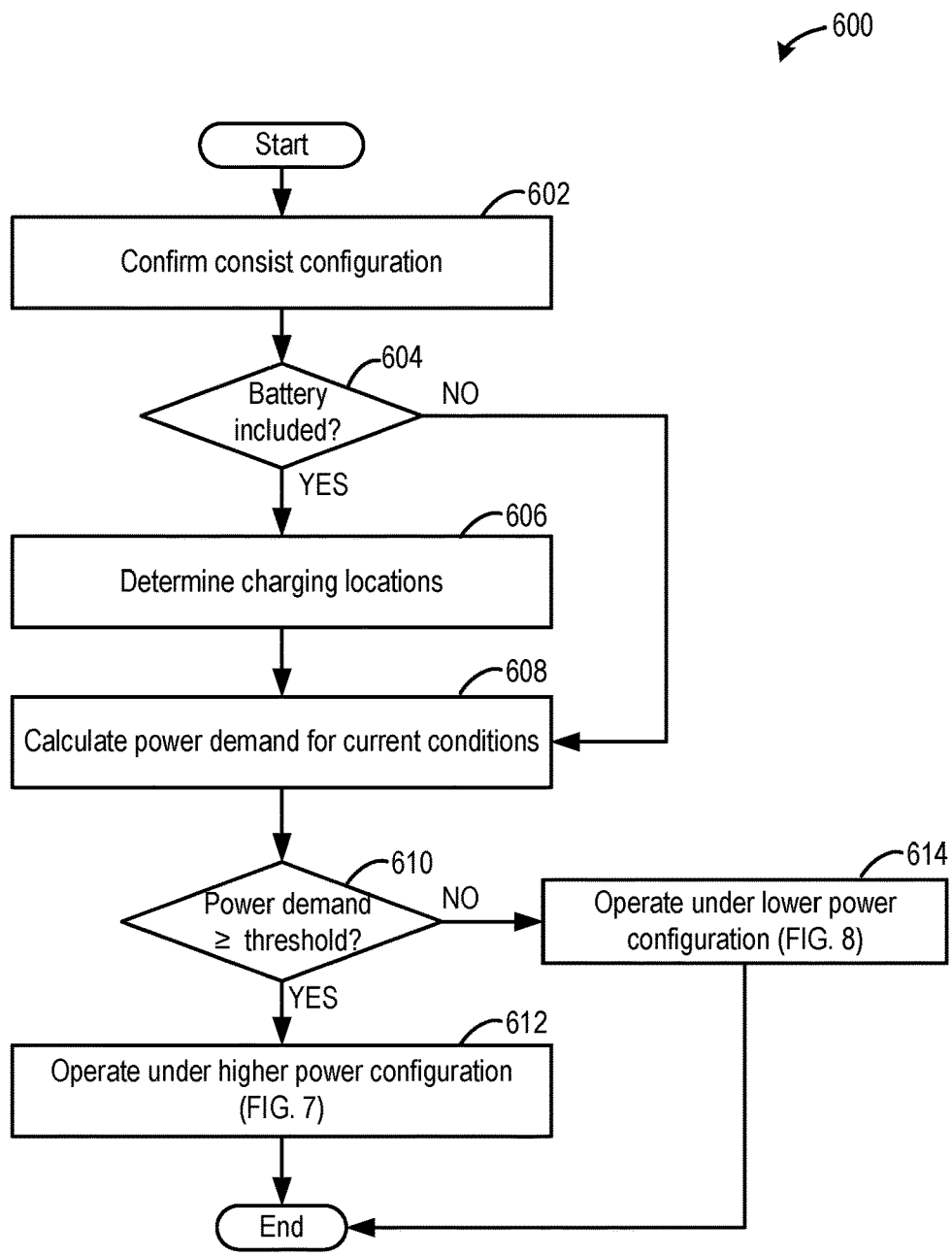
FIG. 6 shows an example of a high level method for an energy management strategy for the locomotive consist.
Figure 7:
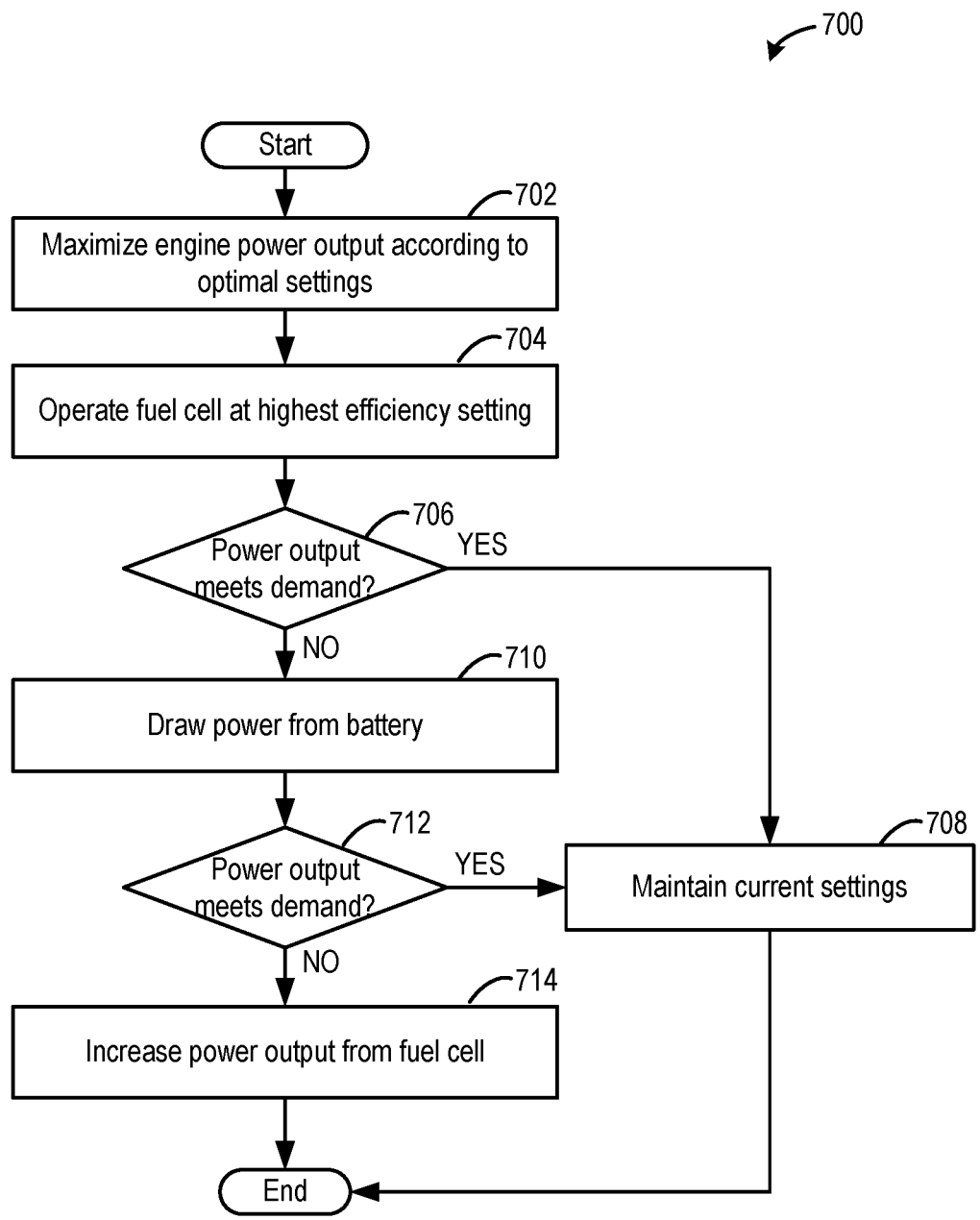
FIG. 7 shows an example of a method for powering the consist according to a higher power configuration.
Figure 8:
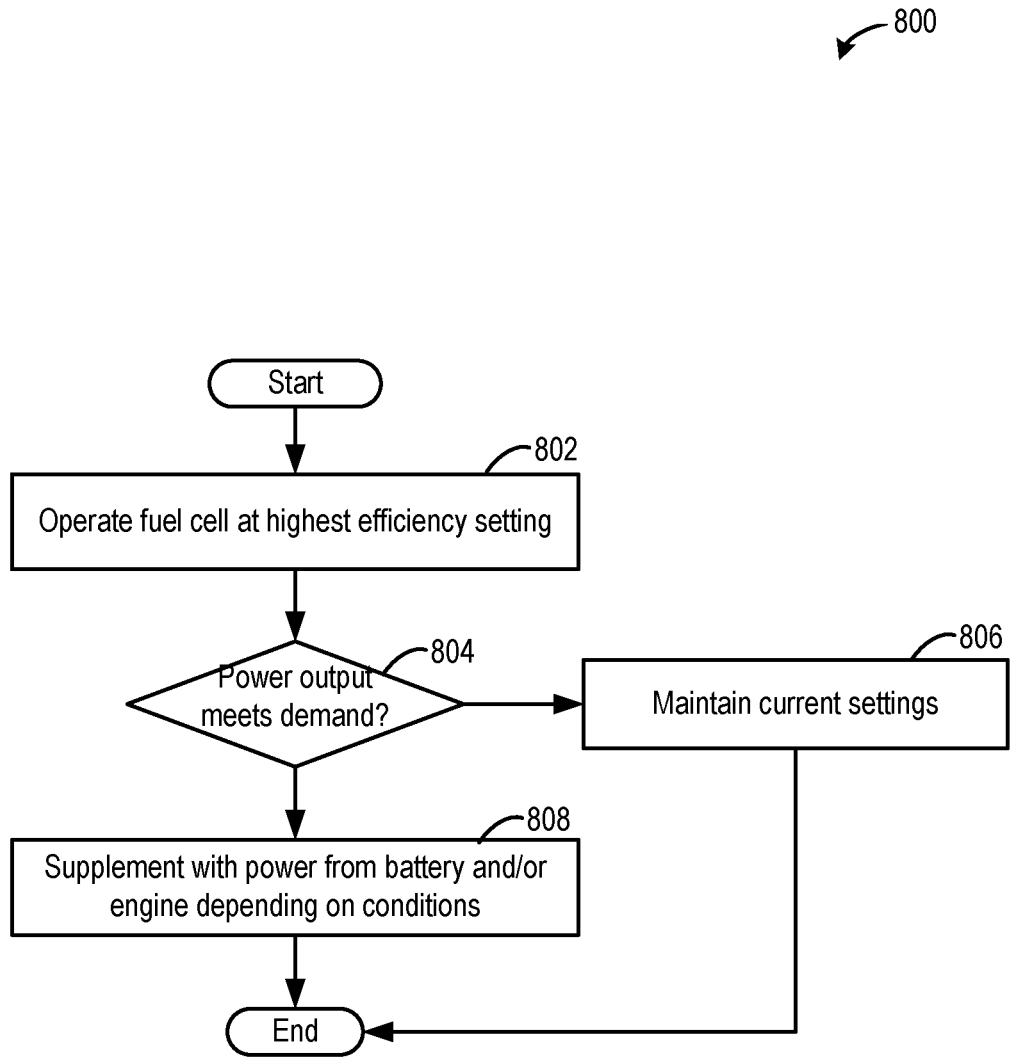
FIG. 8 shows an example of a method for powering the consist according to a lower power configuration.

Methods for energy management in the consist are depicted in FIGS. 6-8. The consist may be a train consist, including a plurality of locomotives. As described above, the consist may be powered by more than one power system, including the engine system, with one or more engines, the battery system, with one or more batteries, and the fuel cell system, with one or more fuel cells. The one or more engines of the engine system may include the multi-fuel engine that combusts diesel as the primary fuel and hydrogen as the secondary fuel. In some embodiments, the engine system may also include the single fuel engine. Instructions for carrying out the methods may be executed by a controller having a plurality of processors based on instructions stored on a memory of the controller and in conjunction with signals received from sensors of the engine system. The controller may employ engine actuators of the engine system to adjust engine operation, according to the methods described below. A trip plan may be stored at the controller, the trip plan providing a travel route to be navigated by the train and used to adjust distribution of a power demand amongst the power systems.

Turning first to FIG. 6, a high-level method 600 for managing the power systems of the consist is depicted. At step 602, the method includes confirming or determining a configuration of the consist with respect to the power systems. For example, the controller may confirm a presence of each of the engine system, the fuel cell system, and the battery system, and further determine a number and location of engines, fuel cells, and batteries that are on-board the consist. The controller may also identify the type of engine (s) present, e.g., the single fuel engine and/or the multi-fuel engine. Conditions and settings of the power systems may be monitored, such as diesel supply levels, hydrogen supply levels, battery state-of-charge (SOC), power outputs corresponding to operation at high efficiency for the engine and the fuel cell, maximum power output of each of the power systems, etc. The controller may also refer to the trip plan to estimate a timing of battery recharging, refueling of fuel reservoirs, and a timing/duration of periods of high power operation versus lower power operation.

At step 604, the method includes confirming if the battery system is included in the consist. For example, the controller may receive signals from at least one battery sensor (e.g., a battery current sensor) coupled to the battery system when the battery system is present. If the battery system is not included, the method continues to step 608 to calculate a power demand based on current conditions, as described further below. If the battery system is present, the method proceeds to step 606 to determine optimal locations along the travel route provided by the trip plan. For example, sections of the travel route where the battery may be charged by harvesting excess power produced by the engine, or by dynamic braking, in addition to locations of charging stations, may be predicted and used to estimate optimal usage of the battery to minimize cycling of the battery between fully charged and fully depleted.

At step 608, the method includes estimating a power demand for operating the train, as powered by the consist, based on current operating conditions. For example, the power demand may depend on route conditions, such as uphill versus downhill navigation, weather conditions, and an estimation of a tractive effort to maintain a target travel speed of the train under the operating conditions.

At step 610, the method includes determining if the power demand is greater than a threshold. The threshold may be a boundary between high power operation and lower power operation of the consist. For example, the threshold may be a power demand level above which an efficiency of fuel cell operation is lower than an efficiency of engine operation. In one embodiment, the threshold may be 70% of a maximum power output of the power systems, e.g., an overall power rating, of the consist.

If the power demand is equal to or greater than the threshold, the method continues to step 612 to operate the power systems in a higher power configuration as shown in FIG. 7. If the power demand is less than the threshold, the method proceeds to step 614 to operate the power systems in a lower power configuration, as shown at FIG. 8. The method then ends.

Turning now to FIG. 7, a method 700 for operating the power systems of the consist at the higher power configuration is depicted. The method continues from step 612 of FIG. 6. At step 702, the method includes increasing a power output of the engine (or engines) according to optimal settings for engine operation. The optimal settings may include operating the engine at a high efficiency point and high fuel efficiency. For the single fuel engine, the controller may refer to a lookup table or map providing a relationship between efficiency and power output to determine the maximum efficiency range of the single fuel engine with respect to power output. For the multi-fuel engine, the controller may rely on the relationship between efficiency and power output and additionally refer to a lookup table providing optimized substitution ratios according to power output. A balance between maximizing efficiency, minimizing fuel consumption, and maximizing the substitution ratio may be determined. In some instances, high loads at the engine may demand low substitution ratios in order to suppress knock. As such, maximizing substitution ratio may be omitted and operating the engine based on efficiency and fuel consumption may be prioritized.

At step 704, the method includes operating the fuel cell to provide power at a high efficiency point. The high efficient point may correspond to a power output of the fuel cell that is between about 40%-60% of a maximum power output of the fuel cell. The power output of the fuel cell may be added to the power output of the engine.

In some instances, particularly when the engine is the multi-fuel engine and combusts hydrogen, both the engine and the fuel cell may consume hydrogen from a common fuel reservoir. When the hydrogen level in the fuel reservoir becomes low, supply of hydrogen to one of the engine and the fuel cell may be determined based on the power demand and anticipated usage of the engine and the fuel cell, e.g., based on the trip plan. For example, for operation of the consist at the higher power configuration, consumption of hydrogen at the engine may be prioritized over fueling the fuel cell. If the hydrogen level in the fuel reservoir decreases to an extent where operation of both the engine and the fuel cell concurrently is not possible, then the engine may be used, the fuel cell deactivated and the battery used to supplement power from the engine, given that drawing power from the battery does not cause the battery to discharge at a rate at or above a threshold discharge rate, such as 1 C, and the battery is sufficiently charged. If the fuel cell cannot be fueled and the battery cannot be discharged below the threshold discharge rate, the battery may be discharged at higher rate than the threshold discharge rate temporarily if a period of high power operation is known to be relatively brief. In addition, a substitution ratio of the engine may be decreased to conserve fuel for the fuel cell and increase the maximum power output of the engine, or the engine may be run on diesel only if the hydrogen supply is low to conserve hydrogen, which may temporarily cause the engine to be operated at a setting above its maximum efficiency range.

At step 706, the method includes confirming if the combined power output from the engine and the fuel cell meets the power demand. If the power output meets the power demand, the method continues to step 708 to maintain the current operating settings of the engine and the fuel cell. The method then ends.

If the power output does not meet the power demand, the method proceeds to step 710 to draw power from the battery. A magnitude of the power shortfall may determine a discharge rate of the battery, provided that the discharge rate remains lower than the threshold discharge rate. For example, a larger power shortfall may cause the battery to discharge power at a faster rate than a smaller power shortfall. Furthermore, frequent cycling of the battery between fully charge and fully depleted may expedite battery degradation and decrease capacity. In some instances, when the SOC of the battery decreases to an extent that even briefly drawing power from the battery may lead to full depletion, use of the battery to provide power for propulsion may be denied. In addition, if the battery is anticipated to be discharged at a rate exceeding the threshold discharge rate in order to meet the power shortfall, usage of the battery may also be denied. As such, at step 712, the method includes confirming if the additional power output from the battery allows the power systems to meet the power demand.

If the power output meets the power demand, the method proceeds to step 708 to maintain the current operating settings. The method then ends. If the power output does not meet the power demand, e.g., battery usage is denied based on low SOC or discharge rate exceeding the threshold discharge rate, the method continues to step 714 to increase the power output from the fuel cell. Increasing the power output from the fuel cell may result in operation of the fuel cell at decreased efficiency. However, by increasing the power output from the fuel cell rather than increasing the power at the engine, an increase in fuel consumption and release of carbon-based emissions is mitigated which may be particularly desirable when the consist is in a zone or region where low emissions regulations is implemented, such as within boundaries of an urban area. Increasing the power output from the fuel cell may also be selected over increasing the power output from the engine when a diesel supply from a fuel reservoir becomes low. In other examples, increasing engine power may be selected over increasing fuel cell power output, such as when hydrogen supply levels are slow.

In instances where the hydrogen supply at the fuel reservoir is low, as described above, engine operating parameters may be adjusted to increase the power output from the engine, despite operating the engine beyond its maximum efficiency range. Furthermore, depletion of the battery may be allowed if a duration of battery discharge is relatively short. The method then ends.

Turning now to FIG. 8, a method 800 for operating the power systems of the consist at the lower power configuration is depicted. The method continues from step 614 of FIG. 6. At step 802, the method includes operating the fuel cell at its high efficiency point. Alternatively, the fuel cell may be operated above the high efficiency point by a margin, such as 10%-15% of a power rating of the fuel cell. The operating point, whether at the high efficiency or at a higher power output than the high efficiency point, of the fuel cell may be selected and set based on a difference between the efficiency of the fuel cell operation and efficiency of the engine operation. For example, the set difference may be a difference of about 20%. As such, engine operation may be constrained to an efficiency range that is below the efficiency point of the fuel cell by the set difference.

At step 804, the method includes confirming if the power output of the fuel cell meets the power demand. If the fuel cell power output meets the power demand, the method proceeds to step 806 to maintain the current operating settings of the fuel cell. The method then ends. If the fuel cell power output does not meet the power demand, e.g., the power output falls short of the power demand, the method continues to step 808 to supplement the power provided by the fuel cell with power from the battery and/or power from the engine. Distribution of the load between the battery and the engine may depend on operating conditions and settings of the battery and the engine.

For example, maximizing the substitution ratio of the engine, when the engine is the multi-fuel engine, discharging the battery at a rate below the threshold discharge rate, and minimizing battery cycling may be prioritized. The engine may be operated to provide supplemental power at a high substitution ratio, such as greater than 1:1 hydrogen to diesel, which may be enabled due to engine operation at low to part-load (e.g., low to mid-power output). A maximum power output of the engine may be constrained by the set difference between the fuel cell efficiency point and the engine efficiency point, as described above.

If the power output from the engine does not provide enough supplemental power, the battery may be used to provide additional supplementary power. Power may be drawn from the battery given that the discharge rate remains below the threshold discharge rate and the SOC of the battery is sufficiently high, or anticipated to remain sufficiently high based on estimations of charging opportunities according to the trip plan, to circumvent charge depletion. Alternatively, the power output from the fuel cell may be supplemented by the battery and the engine operated to provide additional power output if the battery does not allow the power demand to be met or when the battery SOC falls to a level anticipated to lead to depletion before the power demand decreases. Furthermore, the battery may be selected over the engine, given that the battery SOC is sufficiently high and the discharge rate can be maintained below the threshold discharge rate, when the hydrogen level at the fuel reservoir is low, e.g., too low to fuel both the fuel cell and the engine or the diesel supply from the fuel reservoir is low. The method then ends.

Figure 9:
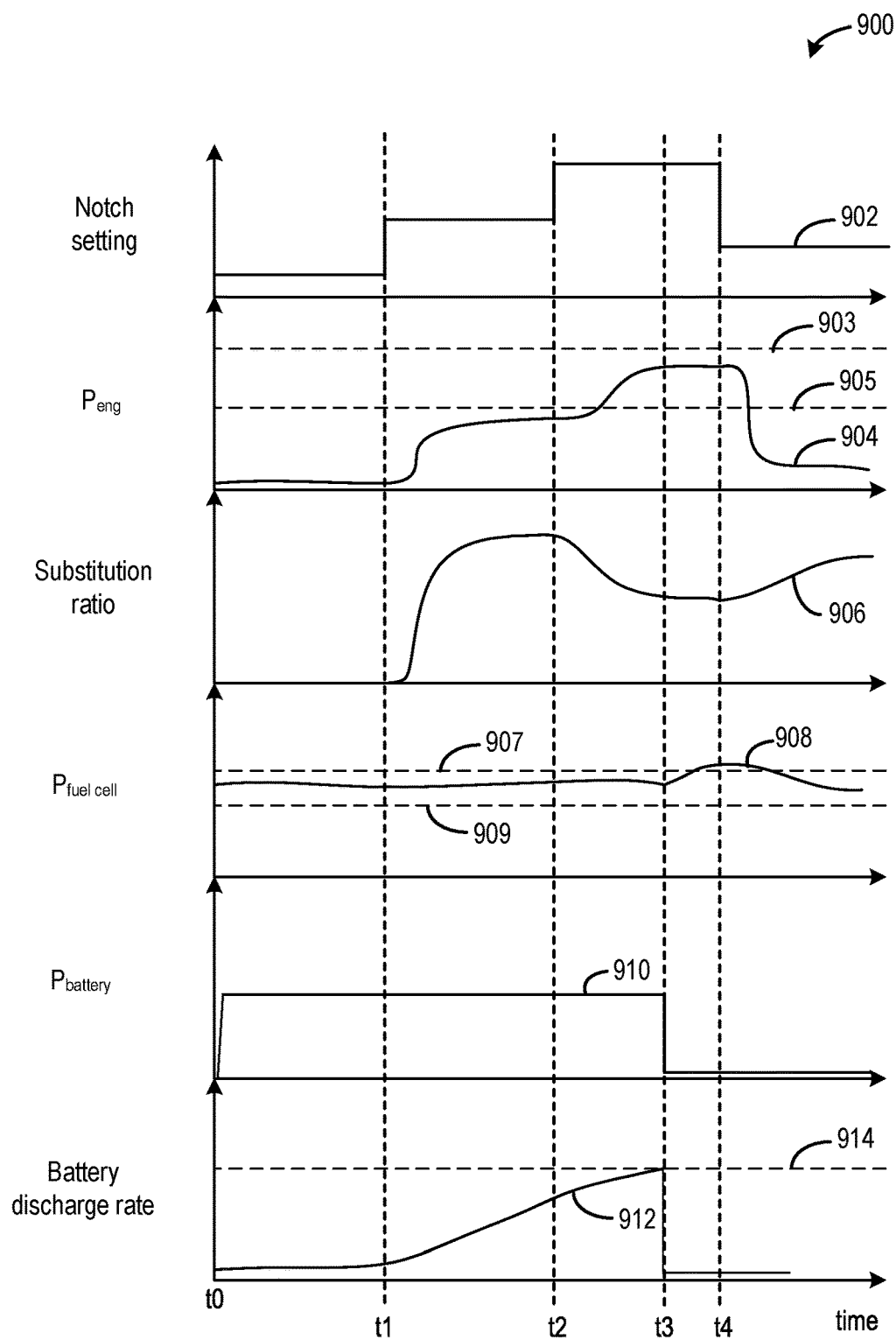
FIG. 9 shows an example of variations in operating parameters of power systems of the locomotive consists according to power demand.

Examples of variations in operating parameters of the power systems of the consist relative to time are shown in FIG. 9 in a graph 900. Time increases to the right along the x-axis. The graph includes a first plot 902, representing a notch setting of a notch throttle, a second plot 904, representing the power output of the multi-fuel engine, a third plot 906, representing the substitution ratio at the multi-fuel engine (e.g., of hydrogen to diesel, for example), a fourth plot 908, representing the power output of the fuel cell, a fifth plot 910, representing the power output of the battery, and a sixth plot 912, representing the discharge rate of the battery. A maximum efficiency range of the engine is indicated by dashed lines 903 and 905, representing an upper boundary and a lower boundary, respectively. The upper boundary may be 90% and the lower boundary may be 60% of a maximum power output of the engine, for example. An optimal power output range of the fuel cell is indicated by dashed lines 907 and 909, representing an upper boundary and a lower boundary, respectively. The upper boundary may be 60% and the lower boundary may be 40% of a maximum or full power capacity of the fuel cell, for example. A threshold discharge rate of the battery is indicated by dashed line 914, which may be 1 C, as an example. The threshold discharge rate may be a discharge rate above which battery degradation may be increased. Each of the operating parameters increase upwards along the respective y-axis.

At t0, the notch setting is low, such as notch 1 or 2. The power demand from the power systems is therefore relatively low. The fuel cell power output is moderate and within its optimal power output range, meeting a large proportion of the power demand (e.g., greater than 50%). A remaining proportion of the power demand is sufficiently low to allow the battery to supplement the power output of the fuel cell while maintaining the discharge rate below the threshold discharge rate. The engine power is not demanded and therefore the substitution ratio is not applied.

At t1, the notch setting is increased to a mid-setting, such as notch 4 or 5. Operation of the fuel cell is maintained within the optimal power output range and battery operation is also maintained. The battery discharge rate rises in response to the higher power demand but remains below the threshold discharge rate. The engine is operated at a mid-load setting, below the maximum efficiency range, to supplement a difference between power provided by the fuel cell/battery combination and the power demand. As engine load increases, the substitution ratio increases to a maximum ratio without incurring knock which decreases a relative amount of diesel combusted and reduces carbon-based emissions.

At t2, the notch setting is increased to a high setting, such as notch 7 or 8. Power delivery from the engine is prioritized and the engine is operated at a high load setting, within its maximum efficiency range. As engine load increases, the substitution ratio is decreased due to a higher likelihood of knock. The power output from each of the fuel cell and the battery is maintained. The discharge rate of the battery increases due to the higher power demand and reaches the threshold discharge rate at t3.

At t3, operation of the battery is terminated. The power output from the fuel cell is increased to compensate for a loss of power upon halting power consumption from the battery, causing the fuel cell to operate above its optimal power output range.

At t4, the notch setting is decreased to a lower setting, such as notch 3. Operation of the fuel cell is maintained and the power output of the fuel cell is decreased, allowing the fuel cell to deliver power within its optimal power output range. The engine is operated at a low load setting, below its maximum efficiency range, to supplement the power output of the fuel cell. The substitution ratio is increased in response to engine operation.

In this way, energy consumption of a consist may be optimized to operate power systems of the consist at high efficiency while reducing degradation. Operation of a fuel cell and an engine according to their respective maximum efficiency ranges, with respect to power output, may prolong a life of the fuel cell and reduce carbon-based emissions from the engine, particularly when the engine is a multi-fuel engine. Furthermore, by strategically relying on battery power when the battery can be discharged below a discharge rate prone to causing faster degradation of the battery, and cycling the battery less frequently, a useful life of the battery may be extended. A performance of each of the power systems may therefore be maintained high while conserving energy.

As used herein, an element or step recited in the singular and proceeded with the word "a" or "an" do not exclude plural of said elements or steps, unless such exclusion is indicated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

As used herein, the term "approximately" is means plus or minus five percent of a given value or range unless otherwise indicated. [claim language will be inserted after review]

In one embodiment, the control system, or controller, may have a local data collection system deployed and may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. The tasks may be machine learning problems such as classification, regression, clustering, density estimation, dimensionality reduction, anomaly detection, and the like. In examples, machine learning may include a plurality of mathematical and statistical techniques. The machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components are restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and control, behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. The neural network can be trained to generate an output based on these inputs, with the output representing an action or sequence of actions that the engine system should take. This may be useful for balancing competing constraints on the engine. During operation of one embodiment, a determination can occur by processing the inputs through the parameters of the neural network to generate a value at the output node designating that action as the desired action. This action may translate into a signal that causes the engine to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes. These may be weighed relative to each other.

The disclosure also provides support for a method for a transportation system, comprising: coordinating a distribution of a power demand in response to a power output of each of a fuel cell system, a battery system, and an engine system, the power output of each of the fuel cell system, the battery system, and the engine system selected based on a respective efficiency of each system. In a first example of the method, coordinating the distribution of the power demand includes adjusting the distribution based on one or more of estimated power demands along a determined trip plan, a fuel reservoir level, emissions regulations according to a region of the determined trip plan, and a state-of-charge of one or more batteries of the battery system. In a second example of the method, optionally including the first example, coordinating the distribution of the power demand includes distributing the power demand amongst one or more engines of the engine system, one or more batteries of the battery system, and one or more fuel cells of the fuel cell system, and wherein the one or more engines includes at least one of a single fuel engine and a multi-fuel engine. In a third example of the method, optionally including one or both of the first and second examples, coordinating the distribution of the power demand includes increasing a portion of the power demand delivered by the engine system when the power demand is higher than a threshold, and wherein the threshold is a power demand level above which an efficiency of the fuel cell system is lower than an efficiency of the engine system. In a fourth example of the method, optionally including one or more or each of the first through third examples, coordinating the distribution of the power demand includes operating the fuel cell system between 20-40% of a power rating of the fuel cell system. In a fifth example of the method, optionally including one or more or each of the first through fourth examples, coordinating the distribution of the power demand includes discharging the battery system at a rate less than 1 C. In a sixth example of the method, optionally including one or more or each of the first through fifth examples, coordinating the distribution of the power demand includes increasing a portion of the power demand delivered to the fuel cell system when the power demand is less than the threshold, and wherein coordinating the distribution of the power demand includes supplementing power from the fuel cell system with power from one or more of the engine system and the battery system when the power demand is less than the threshold. In a seventh example of the method, optionally including one or more or each of the first through sixth examples, coordinating the distribution of the power demand includes adjusting the distribution between the battery system, the fuel cell system, and the engine system of a consist.

The disclosure also provides support for a consist, comprising: electric traction motors, an engine, a battery, and a fuel cell, each electrically coupled to the electric traction motors, and a controller, configured with executable instructions stored on non-transitory memory that, when executed, cause the controller to: operate the engine at a first efficiency setting to meet at least a portion of a power demand and supplement a power output of the engine with power from one or more of the fuel cell and the battery when the power demand is at a first level, and operate the fuel cell at a second efficiency setting to meet at least a portion of the power demand and supplement a power output of the fuel cell with power from one or more of the engine and the battery when the power demand is at a second level, the second level lower than the first level, wherein a discharge rate of the battery is maintained below a threshold discharge rate. In a first example of the system, the engine is a multi-fuel engine configured to combust hydrogen and diesel, and wherein the hydrogen is supplied from a hydrogen reservoir fueling both the multi-fuel engine and the fuel cell. In a second example of the system, optionally including the first example, a substitution ratio of hydrogen to diesel of the multi-fuel engine is maximized when the engine is supplementing the power output of the fuel cell. In a third example of the system, optionally including one or both of the first and second examples, the first efficiency setting of the engine is an efficiency corresponding to 70% to 100% of a rated power output of the engine. In a fourth example of the system, optionally including one or more or each of the first through third examples, the second efficiency setting of the fuel cell is an efficiency corresponding to 20% to 40% of a maximum power output of the fuel cell, and wherein operation of the fuel cell at the second efficiency setting decreases degradation of the fuel cell. In a fifth example of the system, optionally including one or more or each of the first through fourth examples, the threshold discharge rate of the battery is 1 C.

The disclosure also provides support for a method for energy management at a consist, comprising: operating an engine when a power demand is above a threshold power level, and supplementing a power output of the engine with power from one or more of a fuel cell and a battery, operating the fuel cell when the power demand is below the threshold power level, and supplementing a power output of the fuel cell with power from one or more of the engine and the battery, and maintaining a discharge rate of the battery below a threshold discharge rate. In a first example of the method, supplementing the power output of the engine includes operating the fuel cell at 20%-40% of a power rating of the fuel cell. In a second example of the method, optionally including the first example, supplementing the power output of the fuel cell includes adjusting engine operation to increase combustion of a non-carbon fuel relative to a carbon-based fuel when the engine is a multi-fuel engine. In a third example of the method, optionally including one or both of the first and second examples, maintaining the discharge rate of the battery below the threshold discharge rate includes maintaining the discharge rate of the battery below 1 C to minimize degradation of the battery. In a fourth example of the method, optionally including one or more or each of the first through third examples, supplementing the power output of each of the engine and the fuel cell with power from the battery includes minimizing cycling of the battery between fully charged and fully depleted. In a fifth example of the method, optionally including one or more or each of the first through fourth examples, supplementing the power output of one of the engine or the fuel cell includes adjusting power supplementation from the other of the engine or the fuel cell and/or the battery based on one or more of estimated power demands along a determined trip plan, a fuel reservoir level, emissions regulations according to a region of the determined trip plan, and a state-of-charge of the battery.

This written description uses examples to disclose the invention, including the best mode, and also to enable a person of ordinary skill in the relevant art to practice the invention, including making and using devices or systems and performing the incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for a transportation system, comprising:
   selecting a power output of each of a fuel cell system, a battery system, and an engine system based on a respective efficiency of each system; and
   coordinating a distribution of a power demand in response to the selected power output of each of the fuel cell system, the battery system, and the engine system.

2. The method of claim 1, wherein coordinating the distribution of the power demand includes adjusting the distribution based on one or more of estimated power demands along a determined trip plan, a fuel reservoir level, emissions regulations according to a region of the determined trip plan, and a state-of-charge of one or more batteries of the battery system.

3. The method of claim 1, wherein coordinating the distribution of the power demand includes distributing the power demand amongst one or more engines of the engine system, one or more batteries of the battery system, and one or more fuel cells of the fuel cell system, and wherein the one or more engines includes at least one of a single fuel engine and a multi-fuel engine.

4. The method of claim 3, wherein coordinating the distribution of the power demand includes increasing a portion of the power demand delivered by the engine system when the power demand is higher than a threshold, and wherein the threshold is a power demand level above which an efficiency of the fuel cell system is lower than an efficiency of the engine system.

5. The method of claim 3, wherein coordinating the distribution of the power demand includes operating the fuel cell system at a power output level in a power output range of 20% to 40% of a rated power of the fuel cell system.

6. The method of claim 4, wherein coordinating the distribution of the power demand includes discharging the battery system at a rate less than 1 charge capacity per hour, wherein the charge capacity is associated with the one or more batteries of the battery system.

7. The method of claim 4, wherein coordinating the distribution of the power demand includes increasing a portion of the power demand delivered to the fuel cell system when the power demand is less than the threshold, and wherein coordinating the distribution of the power demand includes supplementing power from the fuel cell system with power from one or more of the engine system and the battery system when the power demand is less than the threshold.

8. The method of claim 1, wherein coordinating the distribution of the power demand includes adjusting the distribution between the battery system, the fuel cell system, and the engine system of a consist.

9. A consist, comprising:
electric traction motors;
an engine, a battery, and a fuel cell, each electrically coupled to the electric traction motors; and
a controller, configured with executable instructions stored on non-transitory memory that, when executed, cause the controller to:
operate the engine at a first efficiency setting to meet at least a portion of a power demand and supplement a power output of the engine with power from one or more of the fuel cell and the battery when the power demand is at a first level; and
operate the fuel cell at a second efficiency setting to meet at least a portion of the power demand and supplement a power output of the fuel cell with power from one or more of the engine and the battery when the power demand is at a second level, the second level lower than the first level;
wherein a discharge rate of the battery is maintained below a threshold discharge rate.

10. The consist of claim 9, wherein the engine is a multi-fuel engine configured to combust hydrogen and diesel, and wherein the hydrogen is supplied from a hydrogen reservoir fueling both the multi-fuel engine and the fuel cell.

11. The consist of claim 10, wherein a substitution ratio of hydrogen to diesel of the multi-fuel engine is maximized when the engine is supplementing the power output of the fuel cell.

12. The consist of claim 9, wherein the first efficiency setting of the engine is an efficiency corresponding to 70% to 100% of a rated power output of the engine.

13. The consist of claim 9, wherein the second efficiency setting of the fuel cell is an efficiency corresponding to 20% to 40% of a maximum power output of the fuel cell, and wherein operation of the fuel cell at the second efficiency setting decreases degradation of the fuel cell.

14. The consist of claim 9, wherein the threshold discharge rate of the battery is 1 charge.

* * * * *